United States Patent Office 3,536,954
Patented Oct. 27, 1970

3,536,954
INSTANT ILLUMINATION AND BALLAST CIRCUIT FOR GAS DISCHARGE LAMP
Jack E. Haymaker and Richard L. Fetter, Newark, Ohio, assignors to Holophane Company, Inc., New York, N.Y., a corporation of Delaware
Filed July 11, 1968, Ser. No. 744,233
Int. Cl. H05b *41/18, 41/30*
U.S. Cl. 315—98      2 Claims

ABSTRACT OF THE DISCLOSURE

Current passing through the mercury lamp during the striking and warm-up period thereof is absorbed by an incandescent lamp which simultaneously provides an instant light output. As the light intensity of the mercury lamp increases the incandescent lamp is effectively shunted by the output of a transistor circuit which becomes conductive by the action of a turn-on timing means controlled by the current flow through the mercury lamp.

BACKGROUND OF THE INVENTION

The present invention relates to ballast circuit for gas discharge lamps.

In particular, the present invention relates to a semiconductor ballast circuit which provides instant illumination during the starting period of a mercury vapor discharge lamp and the like.

In the U.S. Pat. No. 3,486,069 of Edward Mahler, entitled "Semiconductor Ballast Circuit for Gas Discharge Lamps," there has been described a semiconductor ballast circuit which out-performs any iron ballast in terms of output regulation and wherein the input voltages can be varied in an extremely broad range with minimum change in lamp output.

Nevertheless, that circuit has a disadvantage in that a certain amount of time elapses from the moment of the switching-on of the mercury lamp till the time point when the lamp reaches useful light output. This retardment can be a serious handicap particularly in commerical applications.

SUMMARY OF THE INVENTION

It is accordingly a primary object of the present invention to provide a ballast circuit which will avoid the above drawback of the Mahler circuit.

In particular, it is an object of the present invention to provide a semiconductor ballast circuit which represents a simplification and modification of the Mahler circuit and which provides an instant illumination during the starting period of the mercury lamp.

In accordance with a primary feature of the present invention, an incandescent lamp is used to ballast the mercury lamp during starting condition of the latter. The incandescent lamp has approximately the same wattage as the mercury lamp and absorbs most of the applied voltage. The time the incandescent lamp is "on" is determined by the time constant of the resistor-capacitor (R1–C1) turn-on circuit for the output stage transistor of a current limiting amplifier. As the light intensity of the mercury lamp increases, the light intensity of the incandescent lamp decreases. As the mercury lamp approaches full light output, the transistor T3 turns full "on" effectively turning off the incandescent lamp and transferring the ballasting function to the more efficient silicon controlled rectifier SCR. This smooth transfer of the ballasting function allows the circuit to operate without the high voltage sensor and current sensors of the Mahler circuit.

BRIEF DESCRIPTION OF THE DRAWING

The invention is illustrated by way of example in the accompanying drawing in which.

Figure 1:
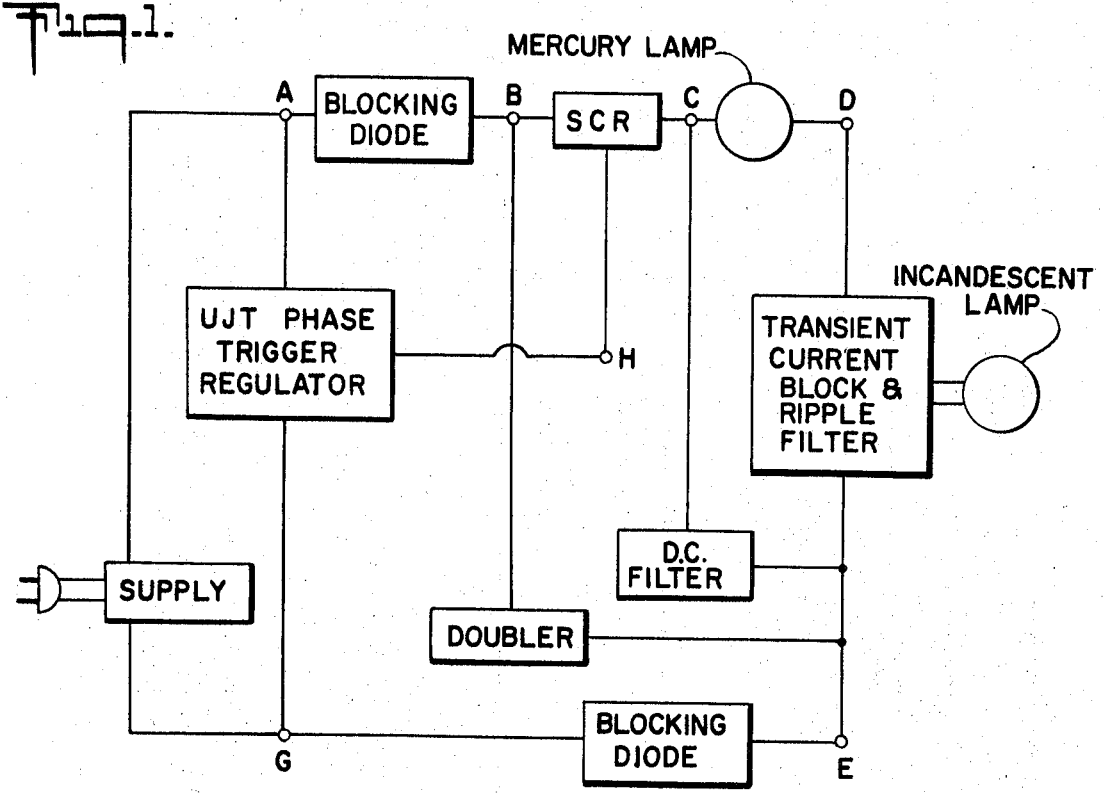
FIG. 1 is a block diagram of the ballast circuit of the present invention.
Figure 2:
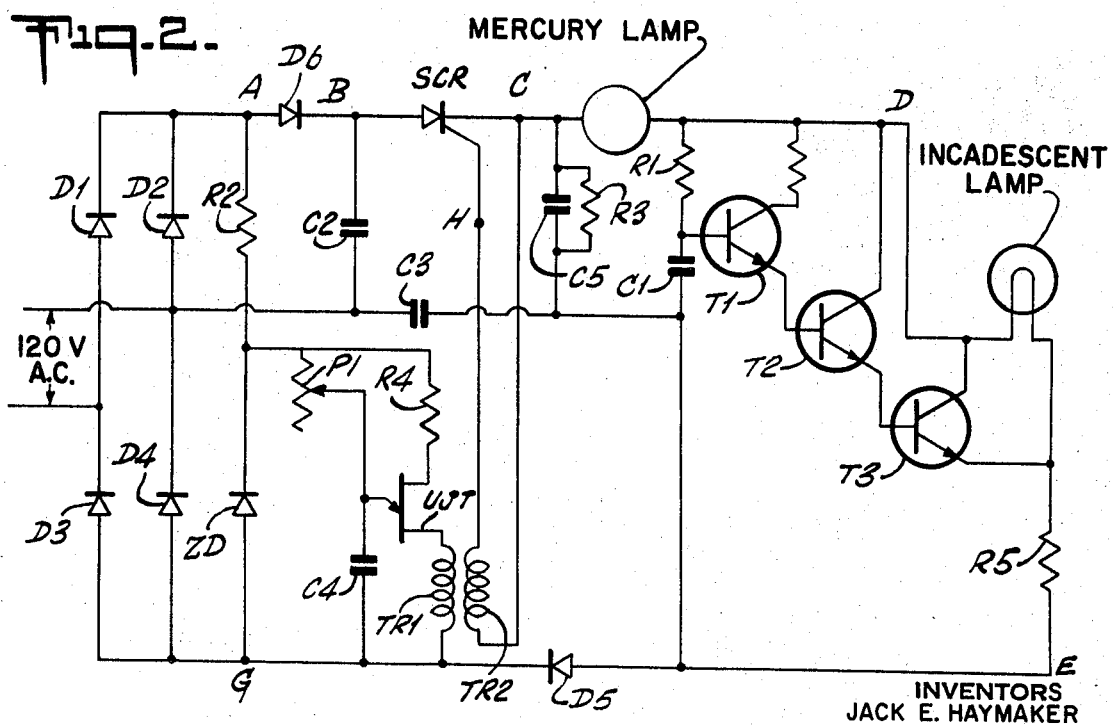
FIG. 2 is a schematical diagram of the circuit of FIG. 1.

As seen from FIG. 1, the alternating voltage from the plug is first converted into a direct current or D.C. square wave voltage between points A and G. This D.C. voltage is applied to a voltage doubler which builds up sufficient potential to cause the mercury lamp to strike. Because of the lack of current flow in the prestrike period, the unijunction transistor phase trigger regulator allows the silicon controlled rectifier SCR to be full "on." Thus, the high voltage produced by the doubler circuit appears across terminals C and E. Since no current flows prior to strike of the mercury lamp, the potential at D is nearly equal to that at E and, therefore, the strike potential also appears across the mercury lamp terminals. Since the capacitor C5 of the D.C. filter is fully charged to the strike potential at the strike moment, and the impedance of the mercury lamp drops from almost infinite to almost negligible, the transient current block means are employed to prevent instant discharge of the D.C. filter capacitor when the mercury lamp begins to conduct. If this is not done the sudden current surge, reinforced by the negative resistance characteristic of the mercury lamp, discharges the D.C. filter capacitor so rapidly that the mercury lamp extinguishes before more current from the supply can get to it. The transient current block and ripple filter, immediately following the mercury lamp strike, acts as a temporary current limiter preventing this rapid discharge and mercury lamp "flashout." This is accomplished, as shown in FIG. 2, by insuring that the three transistors T1–T3 which constitute the transient current block means are locked off during and immediately following the strike. Thus, current passing through the mercury lamp at this time must pass through the shunt resistor across the output transistor T3.

In accordance with the present invention this shunt resistor is represented by the filament of an incandescent lamp of approximately the same wattage as the mercury lamp as to absorb most of the applied voltage. The "off" condition of the three transistors T1 to T3 comprises the transient current block at strike time, and the time the incandescent lamp is "on" is determined by the time constant of the R1 resistor-C1 capacitor circuit at the input of the transistor T1. As the light intensity of the mercury lamp increases, the voltage across the mercury lamp increases thus decreasing the voltage and light intensity of the incandescent lamp, the C1 capacitor slowly charges, the T3 transistor becomes turned on and the current through the incandescent lamp and consequently its light intensity is further decreased. As the mercury lamp approaches full light output, the T3 transistor turns full on, the incandescent lamp is turned off and the task of current control is transferred directly through the unijunction transistor phase trigger regulator to the SCR circuit. When the UJT is triggered the SCR is also triggered and passes the current in the manner as described in the Mahler circuit. However, due to the smooth transfer of the ballasting function of the incandescent lamp the circuit can operate without the high voltage sensor monitoring the voltage between C and E, and without the current sensor for the phase trigger regulation.

The transient current block and ripple filter thus performs the function of a fast acting current change limiter by the use of the high gain D.C. amplifier T1–T3 which Oct. 27, 1970   J. E. HAYMAKER ET AL   3,536,954
INSTANT ILLUMINATION AND BALLAST CIRCUIT FOR GAS DISCHARGE LAMP
Filed July 11, 1968

INVENTORS
JACK E. HAYMAKER
RICHARD L. FETTER
BY Nolte & Nolte
ATTORNEYS